United States Patent

Janz

[15] 3,651,419

[45] Mar. 21, 1972

[54] PEAK DEMODULATOR

[72] Inventor: Donald Walter Janz, Framingham, Mass.

[73] Assignee: RCA Corporation

[22] Filed: July 6, 1970

[21] Appl. No.: 52,537

[52] U.S. Cl. ..............................329/101, 307/235, 307/246, 328/134, 329/192, 330/9

[51] Int. Cl. ..............................H03d 1/18

[58] Field of Search ....................329/101, 50, 192; 328/134; 307/246, 248, 235, 235 A; 330/9

[56] References Cited

UNITED STATES PATENTS

| | | | |
|---|---|---|---|
| 2,778,933 | 1/1957 | Crist | 329/50 |
| 3,408,581 | 10/1968 | Wakamoto et al. | 328/134 X |
| 3,457,435 | 7/1969 | Burns et al. | 307/246 X |
| 3,496,387 | 2/1970 | Saito | 307/246 X |
| 3,304,431 | 2/1968 | Biard et al | 307/248 X |
| 3,378,779 | 4/1968 | Priddy | 329/101 |

*Primary Examiner*—Alfred L. Brody
*Attorney*—H. Christoffersen

[57] ABSTRACT

A switch is connected between the output terminal of an amplifier receptive of an amplitude modulated carrier, and a charge storage means. The switch is closed only during each peak of given polarity of an unmodulated carrier of the same frequency as the modulated carrier for permitting the storage means to charge. The time constant of the storage means discharge circuit is sufficiently long so that the storage means does not discharge appreciably during the times the switch is open, whereby a voltage corresponding to the modulation on the carrier develops across the storage means.

6 Claims, 5 Drawing Figures

INVENTOR.
Donald W. Janz

INVENTOR.
Donald W. Janz

INVENTOR.
Donald W. Janz

PEAK DEMODULATOR

BACKGROUND OF THE INVENTION

Many demodulators known in the art require transformers for coupling a reference carrier to the demodulating circuit. This is relatively costly and, in addition, inconvenient to integrate. The circuit of this invention provides a relatively simple and inexpensive transistorized demodulator that does not require a transformer.

SUMMARY OF THE INVENTION

Means responsive to a sinusoid produces a pulse for each peak of a given polarity of the sinusoid. An amplifier has applied to its input terminal a composite signal comprised of the sinusoid and another signal. A switch is connected between the output terminal of the amplifier and a charge storage means. The switch is closed in response to the pulses and the charge storage means charges to the level of the signal appearing at the output terminal of the amplifier.

DETAILED DESCRIPTION

Figure 1:
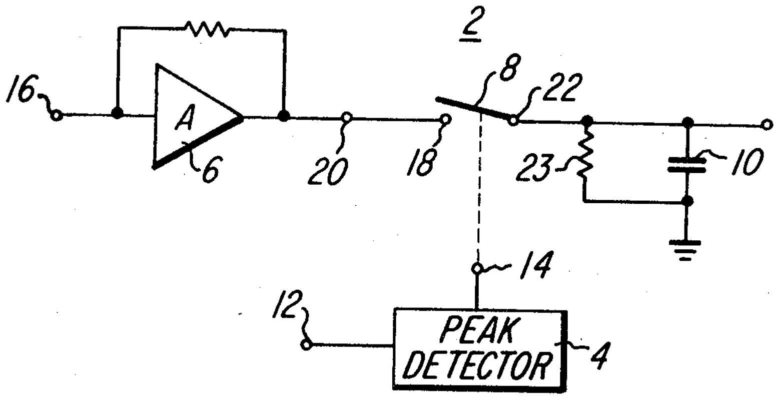
FIG. 1 is a general showing of an embodiment of the invention.

The peak demodulator 2 shown in FIG. 1 comprises a peak detector 4, an operational amplifier 6, a switch 8 and a charge storage means such as a capacitor 10. An unmodulated sinusoidal carrier is applied to the input terminal 12 of the detector 4. For each peak of a given polarity of the carrier, a pulse is generated at the output terminal 14 of the peak detector. For example if the peak detector is responsive to the negative peaks of the sinusoidal carrier, a pulse is generated at the output terminal 14 for each negative peak of the carrier. Each time such a pulse is produced, the switch 8 is closed for the pulse interval, as indicated schematically by the dashed line connecting terminal 14 to switch 8.

A composite signal comprising a sinusoidal carrier of the same frequency as the one discussed above but amplitude modulated by an intelligence signal, is applied to the input terminal 16 of the operational amplifier 6. The output terminal 20 of the amplifier 6 is connected to terminal 18 of the switch 8. Each time switch 8 is closed, the signal present at terminal 20 passes through the switch and charges the capacitor 10. The discharge circuit for the capacitor 10 is illustrated schematically by resistor 23 and its value is sufficiently large that the discharge time constant for capacitor 10 is much larger than its charging time constant. Therefore, as will be explained in greater detail below, a relatively smooth voltage varying in amplitude in accordance with the corresponding variations in the signal modulated onto the carrier, develops across the capacitor 10.

Figure 2:
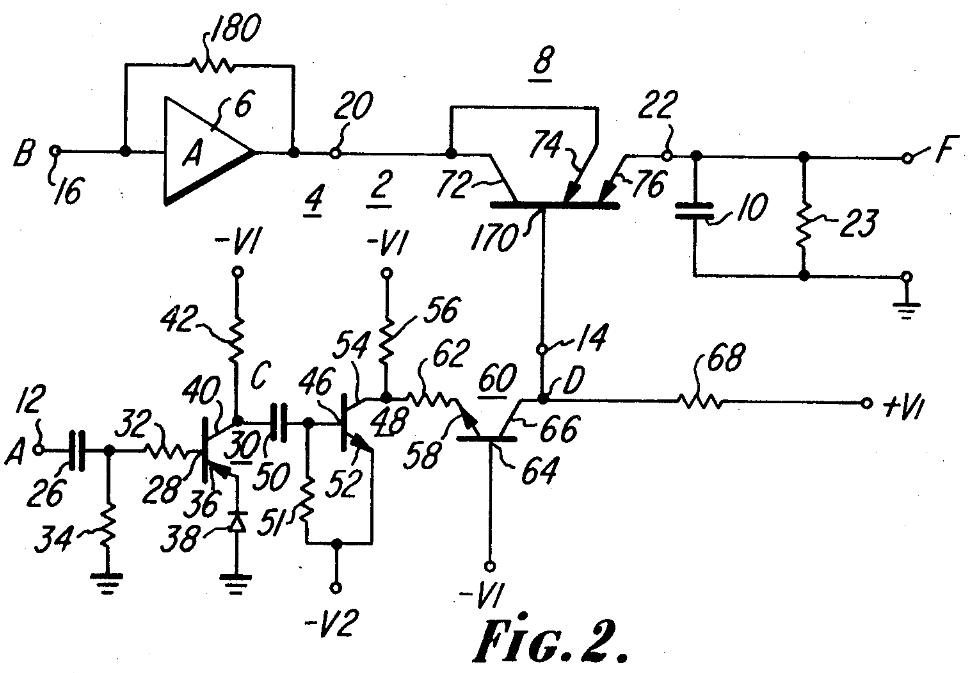
FIG. 2 is a more detailed schematic diagram of the embodiment of the invention shown in FIG. 1.

FIG. 2 is another illustration of the circuit discussed above, showing more of the details. The input terminal 12 of the peak detector 4 is connected to one terminal of a charge storage means such as a capacitor 26, which is connected at its other terminal to the base electrode 28 of a transistor 30 by way of a current limiting resistor 32. The capacitor 26 is also connected to circuit ground by way of a resistor 34. The emitter electrode 36 is connected to circuit ground by way of a diode 38. The collector electrode 40 is connected to a source of reference potential −V1 by way of a resistor 42 and to the base electrode 46 of a transistor 48 by way of a coupling capacitor 50. The base electrode 46 is connected through resistor 51 to a source of reference potential −V2, which is more negative than the source −Vl. The emitter 52 is also connected to the source −V2. The collector electrode 54 is connected to the source −V1 by way of a resistor 56 and to the emitter electrode 58 of a transistor 60 by way of a resistor 62. The base electrode 64 of the transistor 60 is directly connected to the source −V1. The collector electrode 66 of transistor 60 connects to the output terminal 14 of the peak detector 4 and to a source of reference potential +V1 by way of a resistor 68.

Figure 3:
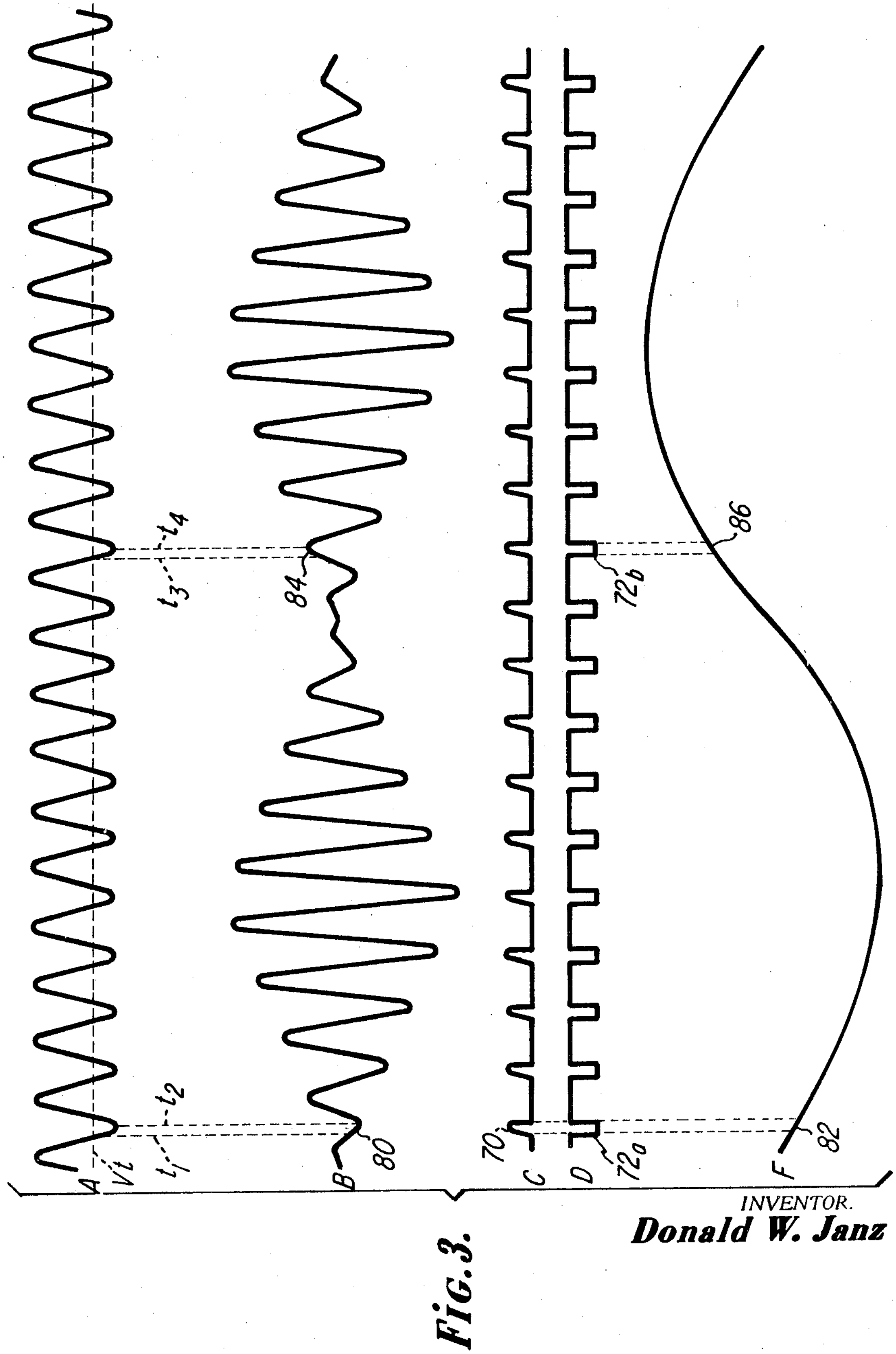
FIG. 3 illustrates a group of waveforms helpful in understanding the operation of the FIG. 2 circuit.

Refer now to FIG. 3 which illustrates some waveshapes present in the circuit of FIG. 2. The waveshape A is the unmodulated sinusoidal carrier which is applied to the terminal 12 of the peak detector 4. When the negative going portion of the wave A reaches a threshold voltage ($V_T$), which is slightly more negative than the base-to-emitter diode drop of the transistor 30 plus the diode drop of diode 38, the transistor 30 begins to conduct. In FIG. 3, conduction starts at time $t_1$ of the wave A, and charges capacitor 26. When transistor 30 becomes conductive, its collector voltage becomes less negative — approaches ground potential, as illustrated at wave C. Conduction through transistor 30 stops at time $t_2$ (wave A) when the voltage applied to terminal 12 results in the voltage at the junction of capacitor 26 and resistors 32 and 34 becoming more positive than the threshold voltage $V_T$. It may be seen therefore, that in the time interval $t_1 - t_2$, a positive pulse 70 is generated at 40 and a similar positive pulse (wave C) is generated for each succeeding negative peak of wave A.

The positive pulses generated at the collector electrode 40 are coupled by way of capacitor 50 to the base electrode of transistor 48. These pulses drive the latter into conduction and the negative pulses which result pass through the emitter-to-collector path of transistor 60 to terminal 14. As shown at D in FIG. 3, each negative peak of the unmodulated sinusoidal carrier applied to the input terminal 12 causes a negative pulse to be generated at the output terminal 14 of the peak detector.

The switch 8 of FIG. 2 comprises a dual emitter transistor having its base electrode 70 connected to the terminal 14. The collector electrode 72 is connected to a first-emitter electrode 74 and to the output terminal 20 of the operational amplifier 6. The second emitter electrode 76 forms the terminal 22 of the switch 8. The resistor 23 is connected in parallel with the capacitor 10 between the terminal 22 and circuit ground.

A characteristic of the dual emitter transistor 8 made use of by the present circuit is the high impedance it exhibits between the terminal 20 and the terminal 22 (of the order of 250 megohms) when in its nonconducting state. When the transistor is conductive, it exhibits an impedance in the order of 50 ohms and a low offset voltage in the order of 50 microvolts between the first and second emitter electrodes 74 and 76. In a configuration where the first emitter electrode 74 is directly connected to the collector electrode 72, as shown, the transistor 8 operates as a bidirectional device. When a negative pulse is produced at the terminal 14, the transistor 8 becomes conductive. If a negative signal appears at the terminal 20, current flows from circuit ground through capacitor 10 to terminal 22 through the emitter 76-to-emitter 74 path to the terminal 20 and through the feedback resistor 180 to the input terminal of the operational amplifier 26, resulting in a negative wave across the capacitor. Conversely, if a positive signal appears at terminal 20, current flows from the terminal 20 through the relatively low impedance path from emitter 74 and to emitter 76 through capacitor 10 to circuit ground resulting in a positive wave across the capacitor.

In the cases discussed above in which the collector 72 is relatively positive, there is also current flow from the collector electrode 72 through the base electrode 170 to the terminal 14 of the peak detector 2. The collector-base current is greater in magnitude than the emitter-emitter current. However, it is not of a magnitude sufficient to distort the wave appearing across the capacitor 10, because of the high loop gain (greater than 50 db. of the operational amplifier 6.

A standard bipolar transistor having only one emitter electrode may be used as the switch 8. However, there will be only unidirectional current flow and a higher collector to emitter offset voltage in the order of 30 millivolts when such a transistor is used. This results, therefore, in a circuit which is able to demodulate a signal of only one polarity with greater offset voltage, whereas the dual emitter transistor provides a capability of demodulating a wave having both a positive and a negative polarity and low offset voltage.

Consider now a composite signal such as illustrated at wave B, FIG. 3 being applied to the terminal 16. As stated earlier, the composite wave B may be sinusoidal carrier of the same frequency as wave A but amplitude modulated by an intelligence signal. Assume that the wave B, generated by a modulator (not shown) is in phase with wave A. In the interval $t_1 - t_2$ (FIG. 3), a negative signal 80 (wave B) is produced at the terminal 20 of amplifier 6. Coincident with the negative signal 80, a negative pulse 72 (wave D) is generated at the terminal 14 of the peak detector 72, which makes transistor 8 conductive. Current then flows from circuit ground through the capacitor 10, the low impedance path of emitter 76-to-emitter 74 and to the terminal 20. The capacitor 10 charges substantially to the negative level of the wave at terminal 20. This is illustrated at 82 wave F (FIG. 3). For each succeeding time interval in which the transistor 8 is turned on, the capacitor 10 charges to the negative level of the signal produced at the terminal 20.

The conducting emitter-emitter impedance plus the output impedance of the operational amplifier is about 50 ohms. The capacitance of the capacitor 10 is about 0.01 microfarad. This results in a charging time constant of the order of 0.5 microseconds. Capacitor 10 charges substantially to the level of the signal at terminal 20 in about 6.0 time constants. Therefore, each pulse of wave D applied to the control terminal of the switch 8 must have a duration slightly longer than 3.0 microseconds. Resistor 23 has an impedance of about 1 meghohm, which results in a discharge time constant of about 10 milliseconds. The result is, therefore, that the capacitor 10 discharges very little between pulses, assuming waveform A has a period in the order of 200 microseconds. Thus, a smooth wave F appears across the capacitor 10 corresponding to the modulation envelope.

Assume now that the wave B, generated by the modulator (not shown) is 180° out of phase with wave A. For example, during the interval $t_3 - t4$ (FIG. 3) a positive signal 84 (wave B) is produced at the terminal 20 of amplifier 6. Coincident with the positive signal 84, a negative pulse 72b (wave D) is generated at the terminal 14 of the peak detector 72, which makes transistor 8 conductive. Current then flows from terminal 20, through emitters 74 and 76 charging capacitor 10 substantially to the positive level at terminal 20. This is illustrated at 86, wave F (FIG. 3). For each succeeding time interval in which transistor 8 is turned on, the capacitor 10 charges to the positive level of the signal produced at terminal 20. Again, the modulation envelope appears across capacitor 10.

Figure 4:
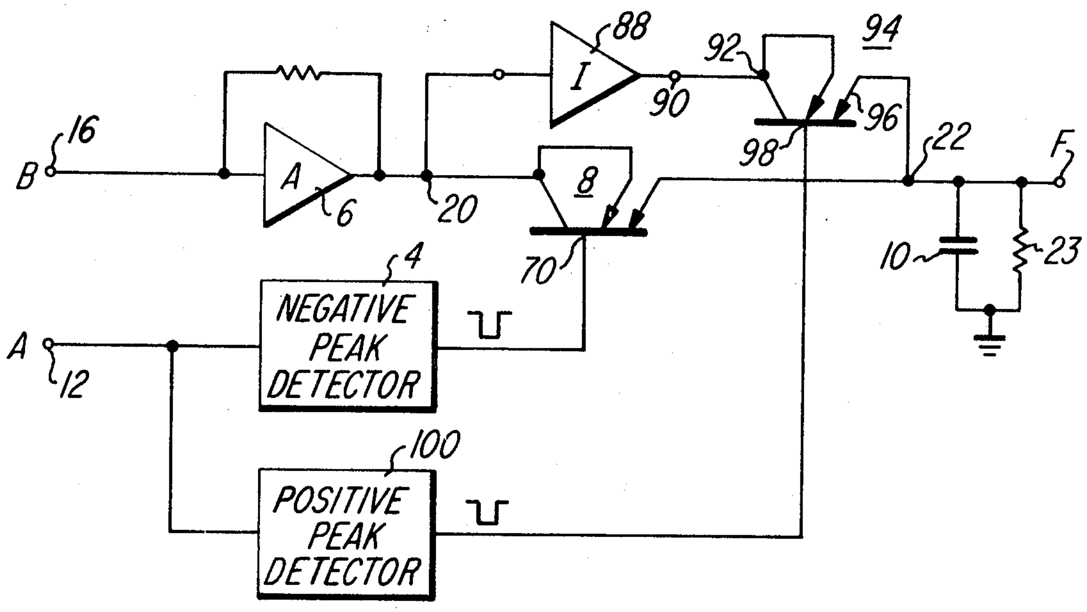
FIG. 4 is a schematic diagram of a full-wave peak demodulator embodying the invention.

A full wave peak modulator embodying the invention is illustrated in FIG. 4. It is similar in many respects to the peak demodulator of FIGS. 1 and 2. In addition there is an inverter 88 having its input terminal connected to the output terminal 20 of amplifier 6 and its output terminal 90 connected to the junction 92 of the collector and first emitter electrodes of a PNP dual emitter transistor 94 which comprises a second switch in the circuit. The second emitter 96 is connected to the terminal 22. The base electrode 98 of transistor 94 is connected to the output terminal of a positive peak detector 100 which has its input terminal connected to terminal 12.

For each detection of a negative peak of the sinusoidal carrier applied to terminal 12, the circuit of FIG. 4 operates in the same manner as the circuits of FIGS. 1 and 2. When a positive peak is detected by the device 100, a negative pulse is applied to the base electrode 98 of device 94 turning it on and switch 8 is turned off. At the same time the positive signal appearing at output terminal 20 of amplifier 6 is inverted by device 88 and capacitor 10 is charged to the level of the signal appearing at terminal 90. The full wave peak demodulator therefore operates at twice the information rate as the half wave peak demodulator illustrated in FIGS. 1 and 2. This results in a smoother envelope appearing at the output terminal F.

Figure 5:
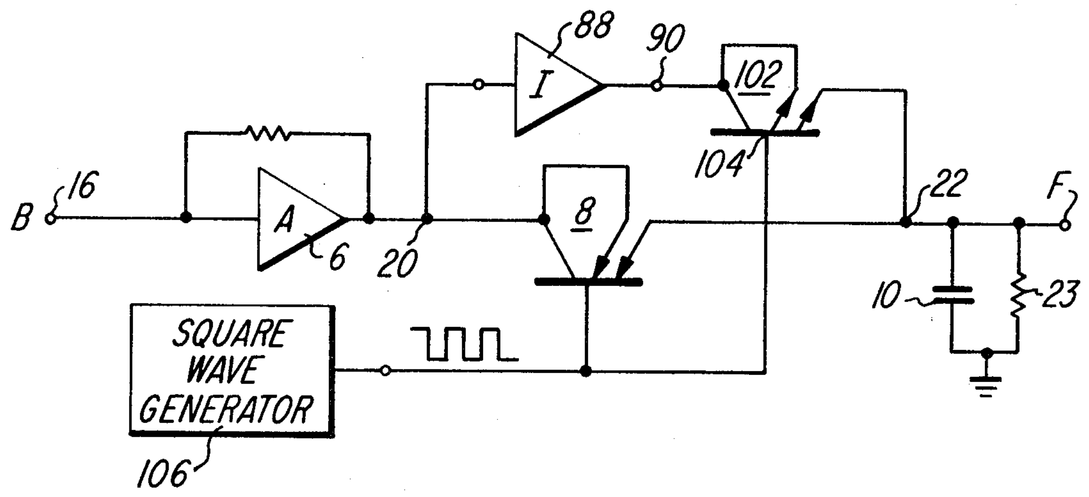
FIG. 5 is a schematic diagram of a full wave averaging demodulator embodying the invention.

FIG. 5 illustrates a full wave averaging demodulator which operates in somewhat the same manner as the demodulator of FIG. 4. The second switch in this circuit however, is an NPN dual emitter transistor 102 which has its collector and first emitter electrode tied together to output terminal 90 of the inverter 88. The second emitter of the device 102 is connected to terminal 22. The base electrode 104 is connected to the output terminal of the square wave generator 106 as is the base electrode 70 of the switch 8.

The square wave generator 106 produces a square wave of frequency *f*. The amplitude modulated carrier signal applied to terminal 16 of amplifier 6 is at the same frequency *f*. For each negative portion of the square wave transistor 8 is turned on and transistor 102 is turned off so that the circuit of FIG. 5 operates in the same manner as the circuits of FIGS. 1, 2 and 4. For each positive portion of the square wave NPN transistor 102 is turned on and switch 8 is turned off and capacitor 10 is charged to the level of the signal at terminal 90.

What is claimed is:

1. In a demodulator, the combination comprising:

a first terminal to which an unmodulated sinusoidal carrier may be applied;

a peak detector having an input terminal connected to said first terminal and an output terminal at which a pulse is produced for each peak of a given polarity of said carrier;

a second terminal to which a sinusoidal carrier of the same frequency as the unmodulated carrier and amplitude modulated by an intelligence signal may be applied;

an operational amplifier having an input terminal connected to said second terminal and having also an output terminal;

a charge storage means; and a first transistor having a base electrode connected to the output terminal of said peak detector, a collector electrode connected to the output terminal of said operational amplifier, and an emitter electrode connected to said charge storage means.

2. The combination claimed in claim 1 said first transistor including a second emitter electrode connected to said collector electrode and to the output terminal of said operational amplifier.

3. The combination claimed in claim 1 said peak detector comprising:

a second transistor having a base electrode connected to said first terminal, an emitter electrode, and a collector electrode;

a third transistor having a base electrode connected to the collector electrode of said second transistor, an emitter electrode, and a collector electrode;

a fourth transistor having an emitter electrode connected to the collector electrode of said third transistor, a collector electrode connected to the base electrode of said first transistor, and a base electrode;

a current source; and means for connecting the emitter electrode of said second transistor, the emitter electrode of said third transistor, and the base electrode of said fourth transistor to said current source.

4. In a demodulator the combination comprising:

a first terminal to which an unmodulated sinusoidal carrier may be applied;

a second terminal to which said carrier which is amplitude modulated by an intelligence signal may be applied;

an amplifier connected at its input terminal to said second terminal and having also an output terminal;

an inverter connected at its input terminal to the output terminal of said amplifier and having also an output terminal;

a charge storage means;

first and second switches, the first connected between the output terminal of said amplifier and said charge storage means, and the second connected between the output terminal of said inverter and said charge storage means; and means responsive to said unmodulated sinusoidal carrier for producing a positive pulse for each positive peak and a negative pulse for each negative peak of said carrier for closing said first switch during each negative pulse interval and for closing said second switch during each positive pulse interval for permitting said charge storage means to charge to the level of the signals present at the output terminals of said amplifier and inverter during said negative and positive pulse intervals, respectively.

5. In a demodulator the combination comprising:

a first terminal to which a square wave of frequency *f* may be applied;

a second terminal to which a carrier of frequency f, amplitude modulated by an intelligence signal may be applied;

an amplifier connected at its input terminal to said second terminal and having also an output terminal;

an inverter connected at its input terminal to the output terminal of said amplifier and having also an output terminal;

a charge storage means;

first and second switches, said first switch connected between the output terminal of said amplifier and said charge storage means, and said second switch connected between the output terminal of said inverter and said charge storage means; and means responsive to each negative and positive portion of said square wave for alternately closing said first and second switches for permitting said charge storage means to charge to the level of the signals present at the output terminals of said amplifier and inverter, respectively.

6. In combination, amplifier means to which a modulated alternating carrier signal may be applied, peak detector means to which an unmodulated alternating carrier signal may be applied, said modulated and said unmodulated carrier signals having the same carrier frequency, said peak detector producing a pulse when said unmodulated alternating carrier signal reaches a predetermined threshold level, transistor means having a base electrode, a collector electrode and a plurality of emitter electrodes, said collector electrode connected to said amplifier means, at least one of said emitter electrodes connected to said collector electrode so that said transistor means operates as a bidirectional device whereby current can pass therethrough from said amplifier means to said output means or vice versa in response to a pulse from said peak detector means, and output means connected to one of said emitter electrodes to operate on signals supplied thereto.

* * * * *